(12) United States Patent
Mao et al.

(10) Patent No.: US 10,973,101 B2
(45) Date of Patent: Apr. 6, 2021

(54) DRIVER FOR LED DEVICE AND LED SYSTEM

(71) Applicant: CURRENT LIGHTING SOLUTIONS, LLC, East Cleveland, OH (US)

(72) Inventors: Zhu Mao, ShangHai (CN); Min Fang, ShangHai (CN); Zhangji Zhou, ShangHai (CN); Shuyi Qin, ShangHai (CN); Fanbin Wang, ShangHai (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/533,891

(22) Filed: Aug. 7, 2019

(65) Prior Publication Data

US 2020/0053847 A1 Feb. 13, 2020

(30) Foreign Application Priority Data

Aug. 7, 2018 (CN) .......................... 201810889236.3

(51) Int. Cl.
*H05B 45/37* (2020.01)
*H02M 3/158* (2006.01)
*H05B 45/10* (2020.01)

(52) U.S. Cl.
CPC .......... *H05B 45/37* (2020.01); *H02M 3/1582* (2013.01); *H05B 45/10* (2020.01)

(58) Field of Classification Search
CPC ............ H05B 33/0815; H05B 33/0848; H05B 33/0851
See application file for complete search history.

(56) References Cited

U.S. PATENT DOCUMENTS

| 8,598,807 B2 | 12/2013 | Ji et al. |
| 8,810,145 B2 * | 8/2014 | Ooto ...................... H05B 45/37 315/224 |

(Continued)

FOREIGN PATENT DOCUMENTS

| CN | 1588523 A | 3/2005 |
| CN | 101154886 A | 4/2008 |

(Continued)

OTHER PUBLICATIONS

Office Action Issued in China Patent Application No. 2018108892363 dated Feb. 2, 2021 (English Translation attached).

(Continued)

*Primary Examiner* — Jany Richardson
(74) *Attorney, Agent, or Firm* — Buckley, Maschoff & Talwalker LLC

(57) ABSTRACT

A single-stage driver for an LED device, configured to be coupled between a power supply and the LED device, comprises: a rectifier, a DC-to-DC converter, a resistor and a controller. The rectifier is configured to be coupled to the power supply and convert an alternating voltage from the power supply into a first direct voltage. The DC-to-DC converter, which comprises at least two switches, is coupled between the rectifier and the LED device and configured to receive the first direct voltage and provide a constant current to the LED device. The resistor is configured to be coupled in series with the LED device. The controller is coupled between the resistor and the at least two switches, and configured to keep the current through the LED device stable around a predetermined current value by controlling the switches based on a voltage across the resistor, wherein all the at least two switches are turned on or off synchronously.

13 Claims, 2 Drawing Sheets

(56) References Cited

U.S. PATENT DOCUMENTS

Figure 1:
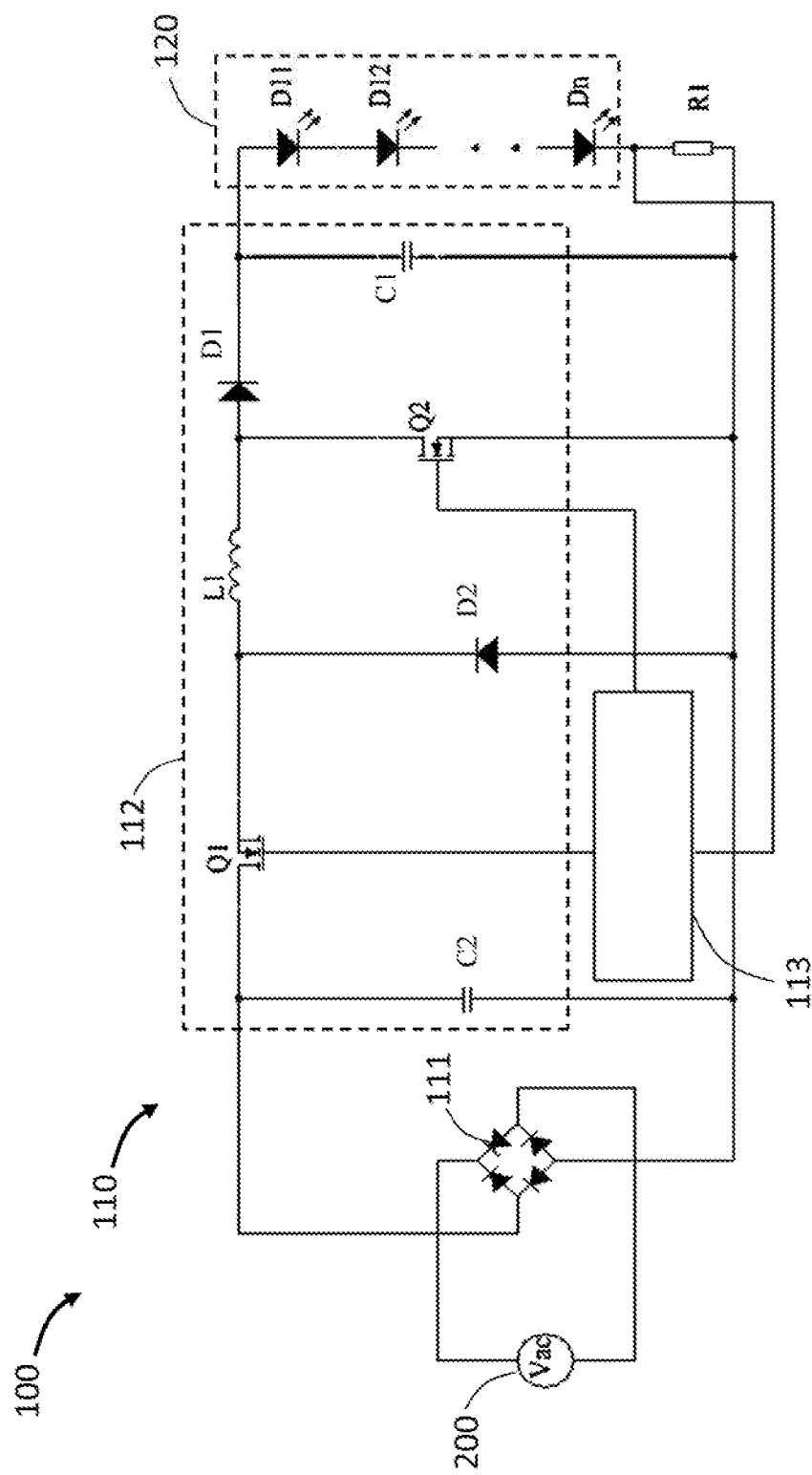

| | | | |
|---|---|---|---|
| 8,884,548 B2* | 11/2014 | Martin-Lopez | H05B 37/02 |
| | | | 315/291 |
| 2009/0103341 A1 | 4/2009 | Lee et al. | |
| 2010/0007317 A1 | 1/2010 | Yang | |
| 2011/0291574 A1* | 12/2011 | Ji | H05B 33/0815 |
| | | | 315/187 |
| 2012/0319604 A1* | 12/2012 | Walters | H02M 3/1582 |
| | | | 315/200 R |
| 2014/0021879 A1* | 1/2014 | Yu | H05B 45/10 |
| | | | 315/206 |
| 2015/0382423 A1 | 12/2015 | Yu et al. | |
| 2016/0081171 A1* | 3/2016 | Ichikawa | B60Q 1/0088 |
| | | | 315/77 |
| 2018/0109188 A1 | 4/2018 | Hedayati et al. | |

FOREIGN PATENT DOCUMENTS

| | | | |
|---|---|---|---|
| CN | 101582633 A | 11/2009 | |
| CN | 102484426 A | 5/2012 | |
| CN | 102742136 A | 10/2012 | |
| CN | 103813581 A | 5/2014 | |
| CN | 104052252 A | 9/2014 | |
| CN | 105932725 A | 9/2016 | |

OTHER PUBLICATIONS

Hou Shiying, et al., "DC-DC Converters Based on Switched-Capacitor Network", In the Journal of Transactions of China Electrotechnical Society, vol. 29, Issue 10, pp. 90-97, Nov. 5, 2014.

* cited by examiner

DRIVER FOR LED DEVICE AND LED SYSTEM

CROSS-REFERENCE

The present invention is a non-provisional application claiming priority to Chinese patent application number 201810889236.3 which was filed on Aug. 7, 2018, incorporated by reference herein in its entirety.

BACKGROUND

Embodiments of the present disclosure relate generally to drivers for LED devices, and LED systems.

The conventional LED drivers applied in high voltage conditions are usually two-stage drivers, which have characteristics of large volume and heavy weight. However, the conventional LED light often have some limitations on the size and weight of the driver, so the conventional high-voltage LED drivers cannot meet the needs of LED lights.

Therefore, it is desirable to provide new drivers for LED devices and LED systems to solve the above-mentioned problem.

BRIEF DESCRIPTION

A single-stage driver for a LED device, configured to be coupled between a power supply and the LED device, comprises: a rectifier, a DC-to-DC converter, a resistor and a controller. The rectifier is configured to be coupled to the power supply and convert an alternating voltage from the power supply into a first direct voltage. The DC-to-DC converter is coupled between the rectifier and the LED device and configured to receive the first direct voltage and provide a constant current to the LED device, the DC-to-DC converter comprising at least two switches. The resistor is configured to be coupled in series with the LED device. The controller is coupled between the resistor and the switches and configured to keep the current through the LED device stable around a predetermined current value by controlling the switches based on a voltage across the resistor, wherein all the switches are turned on or off synchronously.

An LED system comprises an LED device and a single-stage driver for driving the LED device, configured to be coupled between a power supply and the LED device. The driver comprises a rectifier, a DC-to-DC converter, a resistor and a controller. The rectifier is configured to be coupled to the power supply and convert an alternating voltage from the power supply into a first direct voltage. The DC-to-DC converter is coupled between the rectifier and the LED device and configured to receive the first direct voltage and provide a constant current to the LED device, the DC-to-DC converter comprising at least two switches. The resistor is configured to be coupled in series with the LED device. The controller is coupled between the resistor and the switches and configured to keep the current through the LED device stable around a predetermined current value by controlling the switches based on a voltage across the resistor, wherein all the switches are turned on or off synchronously.

DRAWINGS

Figure 2:
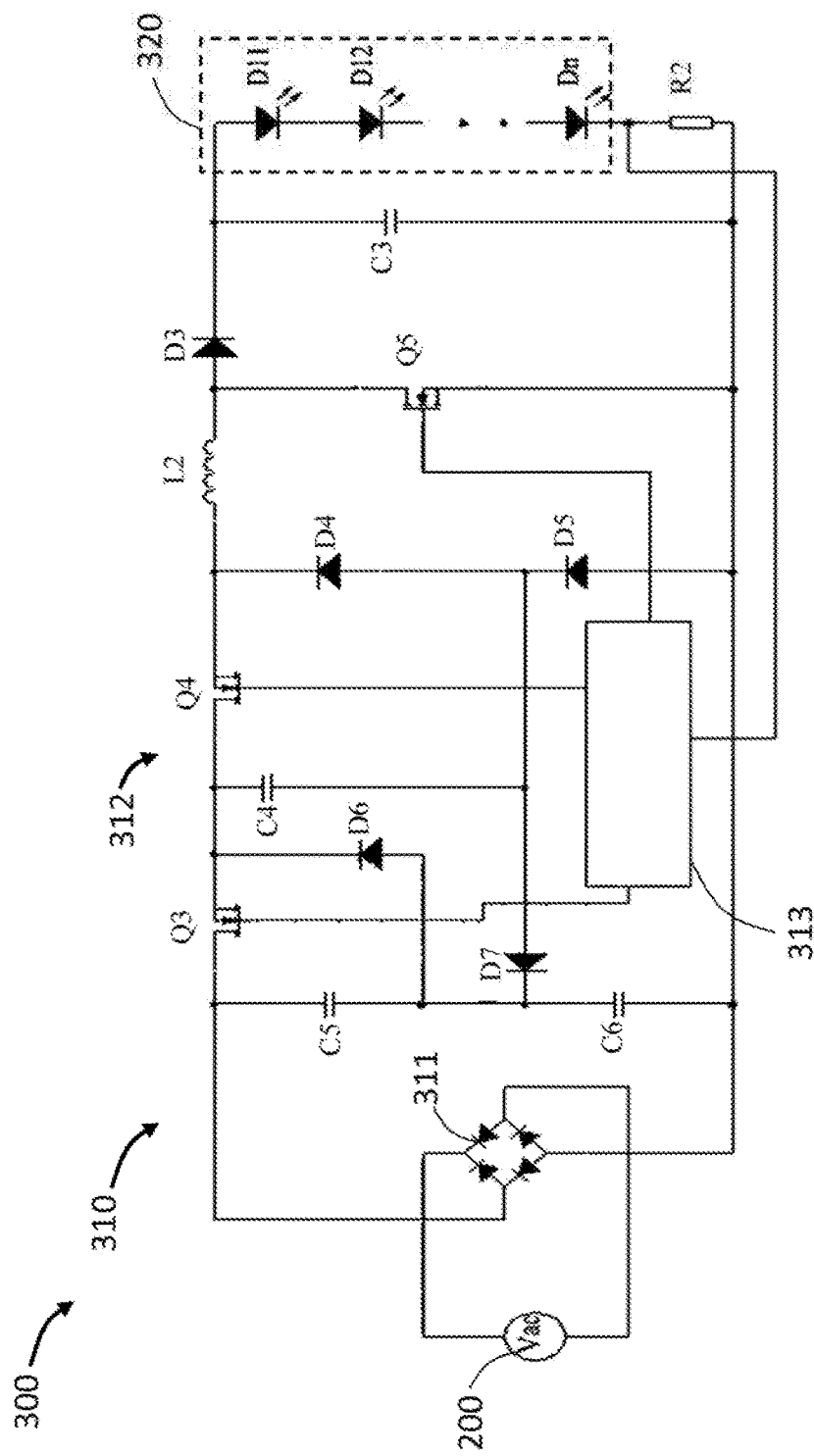

These and other features, aspects, and advantages of the present disclosure will become better understood when the following detailed description is read with reference to the accompanying drawings in which like characters represent like parts throughout the drawings, wherein:

FIG. 1 is a sketch view of an LED system in accordance with an exemplary embodiment of the present disclosure; and FIG. 2 is a sketch view of an LED system in accordance with another exemplary embodiment of the present disclosure.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

Embodiments of the present disclosure relate to an LED system comprising a single-stage driver, which is adaptable to high voltage input conditions and has a high output power.

FIG. 1 is a sketch view of an LED system 100 in accordance with an exemplary embodiment of the present disclosure. Referring to FIG. 1, the LED system 100 is configured to be coupled to the power supply 200, which is an alternating current (AC) power supply outputting an alternating voltage from about 200 volts (V) to about 500 volts (V), for example, from about 277 V to about 480 V. The LED system 100 can work normally under such voltage condition.

The LED system 100 comprises a driver 110 and an LED device 120 coupled to an output terminal of the driver 110. The driver 110 is coupled between the power supply 200 and the LED device 120, and configured to receive the alternating voltage from the power supply 200 and output a constant current to the LED device 120, in order to drive the LED device 120. The LED device 120 comprises a plurality of LED chips D11, D12 to Dn coupled in series.

The driver 110 is a single-stage driver, i.e. the driver 110 comprises and only comprises one voltage converting module. In the embodiment shown in FIG. 1, the driver 110 comprises a rectifier 111, a DC-to-DC converter 112, a controller 113, and a resistor R1. The rectifier 111 is configured to be coupled with the power supply 200 and convert the alternating voltage from the power supply into a first direct voltage. The first direct voltage is output to the DC-to-DC converter 112 via a first and second output terminal of the rectifier 111.

The DC-to-DC converter 112 is coupled between the rectifier 111 and the LED device 120, and configured to receive the first direct voltage and provide a constant current to the LED device 120. The DC-DC converter 112 comprises at least two switches, and is configured to control a value of the constant current outputted to the LED device 120 by synchronously control the at least two switches to be on and off.

In the embodiment shown in FIG. 1, the DC-to-DC converter 112 comprises a buck-boost circuit. Specifically, the DC-to-DC converter 112 comprises a first switch Q1, a second switch Q2, an inductor L1, a first diode D1, a second diode D2, a first capacitor C1, and a second capacitor C2. The first switch Q1, the inductor L1 and the first diode D1 are sequentially coupled in series between the first output terminal of the rectifier 111 and a first terminal of the LED device 120. An anode of the first diode D1 is coupled to the inductor L1, and the cathode of the first diode D1 is coupled to the first terminal of the LED device 120. A cathode of the second diode D2 is coupled to a node between a first switch Q1 and the inductor L1, and an anode of the second diode D2 is coupled to the second output terminal of the rectifier 111. A first terminal of the second switch Q2 is coupled to a node between the inductor L1 and the first diode D1, and the second terminal of the second switch Q2 is coupled to the second output terminal of the rectifier 111. The first capacitor C1 is coupled between the first terminal of the LED device 120 and the second output terminal of the rectifier 111. The second capacitor C2 is coupled between the first and second output terminals of the rectifier 111.

The power supply 200 is configured to charge the inductor L1 via the first and second switches, when the first and second switches are on. The inductor L1 is configured to discharge via the first diode D1, the first capacitor C1 and the second diode D2 when the first and second switches are off.

The resistor R1 is configured to be coupled in series with the LED device 120, in such a manner that a current flowing through the LED device 120 can be measured by detecting a voltage across the resistor R1.

The controller 113 is coupled between the resistor R1 and the switches Q1, Q2, and configured to keep the current through the LED device 120 and the resistor R1 stable around a predetermined current value by controlling the switches Q1, Q2 to be on and off based on the voltage across the resistor, wherein all the switches are turned on or off synchronously.

Specifically, the controller 113 comprises an input terminal and two signal output terminals. The input terminal is coupled to one terminal of the resistor R1 for receiving the voltage across the resistor R1. The two signal output terminals are respectively coupled to a control terminal of the first switch Q1 and a control terminal of the second switch Q2, and configured to send control signals to the first and second switches Q1, Q2. The controller 113 generates the control signal for controlling the switches according to the voltage across the resistor R1, and the control signal is provided to the first and second switches Q1, Q2 respectively via the two signal output terminals. Because the first and second switches Q1, Q2 are controlled by the same control signal, the first and second switches Q1, Q2 will be turned on or off simultaneously.

FIG. 2 is a sketch view of an LED system 300 in accordance with another exemplary embodiment of the present disclosure. Referring to FIG. 2, the LED system 300 comprises a single-stage driver 310 and a LED device 320 coupled to an output terminal of the driver 310. The driver 310 comprises a rectifier 311, a DC-to-DC converter 312, a controller 313 and a resistor R2.

In the embodiment shown in FIG. 2, the DC-to-DC converter 312 comprises a three-level circuit. Specifically, the DC-to-DC converter 312 comprises a first switch Q3, a second switch Q4, a third switch Q5, an inductor L2, a first diode D3, a second diode D4, a third diode D5, a fourth diode D6, a fifth diode D7, a first capacitor C3, a second capacitor C4, a third capacitor C5, and a fourth capacitor C6. The first switch Q3, the second switch Q4, the inductor L2 and the first diode D3 are sequentially coupled in series between a first output terminal of the rectifier 311 and a first terminal of the LED device 320. A first terminal of the inductor L2 is coupled to the second switch Q4, and a second terminal of the inductor L2 is coupled to an anode of the first diode D3. The cathode of the first diode D3 is coupled to the first terminal of the LED device 320. The second diode D4 and the third diode D5 are coupled in series between the first terminal of the inductor L2 and a second output terminal of the rectifier 311, wherein a cathode of the second diode D4 is coupled to the first terminal of the inductor L2, an anode of the second diode D4 is coupled to a cathode of the third diode D5, and an anode of the third diode D5 is coupled to the second output terminal of the rectifier 311. The third switch Q5 is coupled between the anode of the first diode D3 and the second output terminal of the rectifier 311. The first capacitor C3 is coupled between the first terminal of the LED device 320 and the second output terminal of the rectifier 311. The third capacitor C5 and the fourth capacitor C6 are coupled in series between the first and second output terminals of the rectifier 311. An anode of the fourth diode D6 is coupled to a node between the third capacitor C5 and the fourth capacitor C6, and a cathode of the fourth diode D6 is coupled to a node between the first switch Q3 and the second switch Q4. A cathode of the fifth diode D7 is coupled to the node between the third capacitor C5 and fourth capacitor C6, and an anode of the fifth diode D7 is coupled to a node between the second diode D4 and the third diode D5. A first terminal of the second capacitor C4 is coupled to the node between the first switch Q3 and the second switch Q4, and a second terminal of the second capacitor C4 is coupled to the anode of the fifth diode D7.

The power supply 200 is configured to charge the inductor L2 via the first, second and third switches Q3, Q4, Q5 when the first, second and third switches Q3, Q4, Q5 are on. The inductor L2 is configured to discharge via the first diode D3, the first capacitor C3, the third diode D5 and the second diode D4 when the first, second and third switches Q3, Q4, Q5 are off.

The resistor R2 is configured to be coupled in series with the LED device 320, in such a manner that a current flowing through the LED device 320 can be measured by detecting a voltage across the resistor R2.

The controller 313 is coupled between the resistor R2 and the switches Q3, Q4, Q5 and configured to keep the current through the LED device 320 and the resistor R2 stable around a predetermined current value by controlling the switches Q3, Q4, Q5 to be on and off based on the voltage across the resistor R2, wherein all the switches Q3, Q4, Q5 are turned on or off synchronously.

Specifically, the controller 313 comprises an input terminal and three signal output terminals. The input terminal is coupled to one terminal of the resistor R2 for receiving the voltage across the resistor R2. The three signal output terminals are respectively coupled to control terminals of the first switch Q3, the second switch Q4 and the third switch Q5 and configured to send control signals to the first, second and third switches Q3, Q4, Q5. The controller 313 generates the control signal for controlling the switches according to the voltage across the resistor R2, and the control signal is provided to the first, second and third switches Q3, Q4, Q5 respectively via the three signal output terminals. Because the first and second switches Q3, Q4, Q5 are controlled by the same control signal, the first, second and third switches Q3, Q4, Q5 will be turned on or off simultaneously.

Other functions and structures of the rectifier 311, the DC-to-DC converter 312, the controller 313, the resistor R2 and the LED device 320 and the interconnection among them are similar to those of the rectifier 111, the DC-to-DC converter 112, the controller 113, the resistor R1 and the LED device 120 in the embodiment shown in FIG. 1, which will not be repeated here.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

The invention claimed is:

1. A single-stage driver for an LED device, configured to be coupled between a power supply and the LED device, the driver comprising:
   a rectifier, configured to be coupled to the power supply and convert an alternating voltage from the power supply into a first direct voltage;
   a DC-to-DC converter, coupled between the rectifier and the LED device and configured to receive the first direct voltage and provide a constant current to the LED device, the DC-to-DC converter comprising at least two switches, wherein the at least two switches comprises a first switch, a second switch and a third switch, wherein the DC-to-DC converter further comprises an inductor, a first diode, a second diode, a third diode and a first capacitor; the power supply is configured to charge the inductor via the first, second and third switches when the first, second and third switches are on; the inductor is configured to discharge via the first diode, the first capacitor, the third diode and the second diode when the first, second and third switches are off;
   a resistor, configured to be coupled in series with the LED device; and
   a controller, coupled between the resistor and the at least two switches and configured to keep the current through the LED device stable around a predetermined current value by controlling the at least two switches based on a voltage across the resistor, wherein the at least two switches are turned on or off synchronously.

2. The driver according to claim 1, wherein the alternating voltage of the power supply is in a range from about 200V to about 500V.

3. The driver according to claim 1, wherein the controller is configured to receive the voltage across the resistor and generate a control signal according to the voltage for controlling the at least two switches.

4. The driver according to claim 1, wherein the at least two switches comprises a first switch and a second switch, wherein the DC-to-DC converter further comprises an inductor, a first diode, a second diode and a first capacitor, wherein the power supply is configured to charge the inductor via the first and second switches when the first and second switches are on; the inductor is configured to discharge via the first diode, the first capacitor and the second diode when the first and second switches are off.

5. The driver according to claim 4, wherein the first switch, the inductor and the first diode are coupled in series between a first output terminal of the rectifier and a first terminal of the LED device, an anode of the first diode is coupled to the inductor, a cathode of the first diode is coupled to the first terminal of the LED device, a cathode of the second diode is coupled to a node between the first switch and the inductor, an anode of the second diode is coupled to a second output terminal of the rectifier, a first terminal of the second switch is coupled to a node between the inductor and the first diode, a second terminal of the second switch is coupled to the second output terminal of the rectifier, the first capacitor is coupled between the first terminal of the LED device and the second output terminal of the rectifier.

6. The driver according to claim 1, wherein the first switch, the second switch, the inductor and the first diode are coupled in series between a first output terminal of the rectifier and a first terminal of the LED device, a first terminal of the inductor is coupled to the second switch, a second terminal of the inductor is coupled to an anode of the first diode, a cathode of the first diode is coupled to the first terminal of the LED device, the second diode and the third diode are coupled in series between the first terminal of the inductor and a second output terminal of the rectifier, the third switch is coupled between the anode of the first diode and the second output terminal of the rectifier, the first capacitor is coupled between the first terminal of the LED device and the second output terminal of the rectifier.

7. An LED system, comprising:
   an LED device; and
   a single-stage driver for driving the LED device, configured to be coupled between a power supply and the LED device, the driver comprising:
   a rectifier, configured to be coupled to the power supply and convert an alternating voltage from the power supply into a first direct voltage,
   a DC-to-DC converter, coupled between the rectifier and the LED device and configured to receive the first direct voltage and provide a constant current to the LED device, the DC-to-DC converter comprising at least two switches, wherein the at least two switches comprises a first switch, a second switch and a third switch, wherein the DC-to-DC converter further comprises an inductor, a first diode, a second diode, a third diode and a first capacitor; the power supply is configured to charge the inductor via the first, second and third switches when the first, second and third switches are on; the inductor is configured to discharge via the first diode, the first capacitor, the third diode and the second diode when the first, second and third switches are off;
   a resistor, coupled in series with the LED device, and
   a controller, coupled between the resistor and the at least two switches and configured to keep the current through the LED device stable around a predetermined current value by controlling the at least two switches based on a voltage across the resistor, wherein the at least two switches are turned on or off synchronously.

8. The LED system according to claim 7, wherein the alternating voltage of the power supply is in a range from about 200V to about 500V.

9. The LED system according to claim 7, wherein the DC-to-DC converter comprises a buck-boost circuit.

10. The LED system according to claim 7, wherein the DC-to-DC converter comprises a three-level circuit.

11. The LED system according to claim 7, wherein the predetermined current value is a rated current value of the LED device.

12. A single-stage driver coupled between a power supply and an LED device, the driver comprising:
- a rectifier, coupled to the power supply and converting an alternating voltage from the power supply into a first direct voltage;
- a DC-to-DC converter receiving the first direct voltage from the rectifier and providing a constant current to the LED device, the DC-to-DC converter comprising a first switch, a second switch and a third switch, an inductor, a first diode, a second diode, a third diode and a first capacitor, wherein the power supply is configured to charge the inductor via the first, second and third switches when the first, second and third switches are on, and wherein the inductor is configured to discharge via the first diode, the first capacitor, the third diode and the second diode when the first, second and third switches are off;
- a resistor coupled in series with the LED device; and
- a controller, coupled between the resistor and the first, second and third switch and configured to keep the current through the LED device stable around a predetermined current value by controlling the first and the second switch based on a voltage across the resistor such that the first and second switches are turned on or off synchronously.

13. The driver according to claim 12, wherein the first switch, the second switch, the inductor and the first diode are coupled in series between a first output terminal of the rectifier and a first terminal of the LED device, a first terminal of the inductor is coupled to the second switch, a second terminal of the inductor is coupled to an anode of the first diode, a cathode of the first diode is coupled to the first terminal of the LED device, the second diode and the third diode are coupled in series between the first terminal of the inductor and a second output terminal of the rectifier, the third switch is coupled between the anode of the first diode and the second output terminal of the rectifier, the first capacitor is coupled between the first terminal of the LED device and the second output terminal of the rectifier.

* * * * *